Nov. 4, 1958     S. C. NELSON     2,859,064
ROTARY SQUARE LAWN SPRINKLER
Filed April 9, 1956
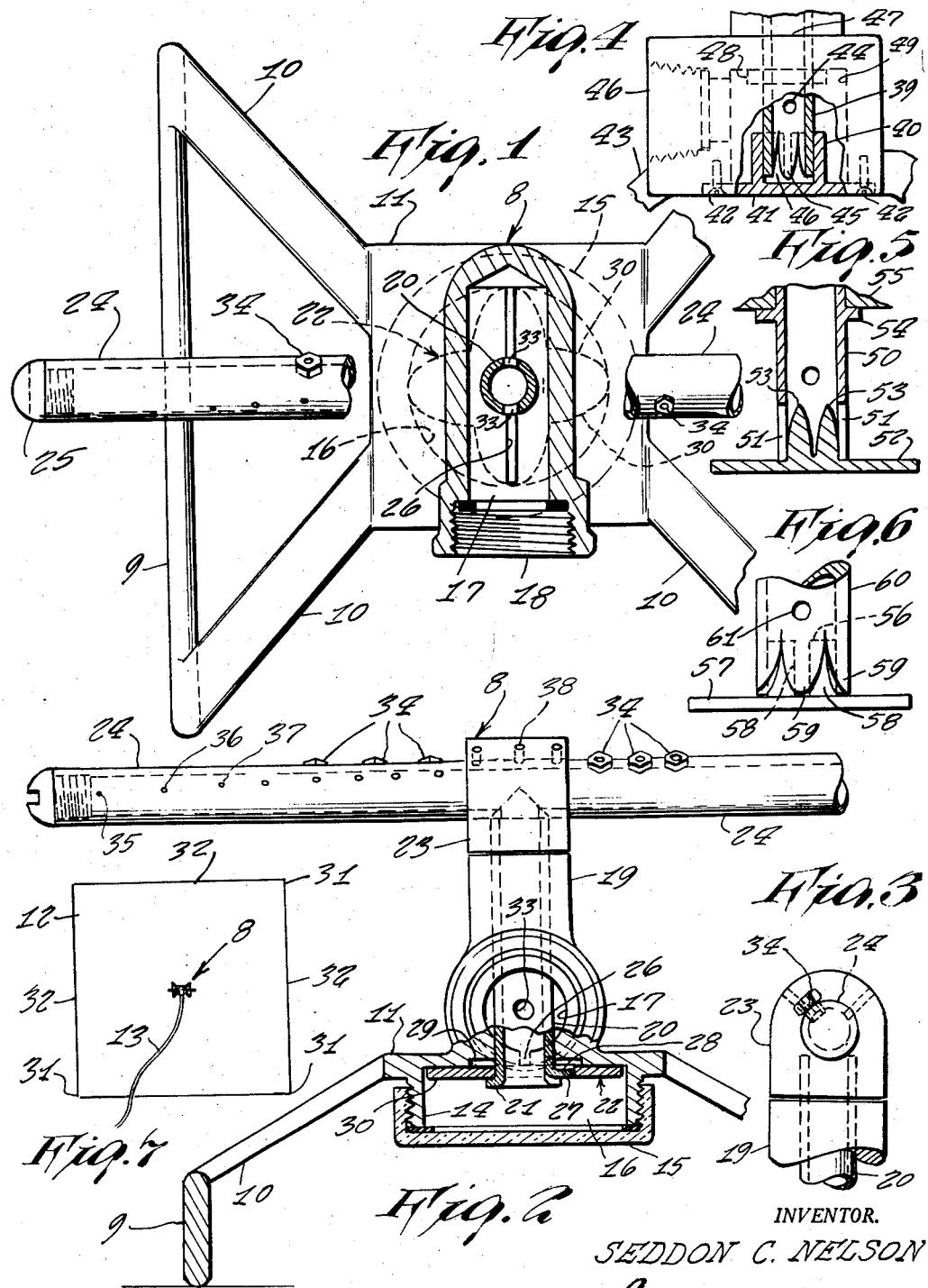
INVENTOR.
SEDDON C. NELSON

United States Patent Office 2,859,064
Patented Nov. 4, 1958

2,859,064

ROTARY SQUARE LAWN SPRINKLER

Seddon C. Nelson, Fredericksburg, Va.

Application April 9, 1956, Serial No. 576,901

9 Claims. (Cl. 299—18)

This invention relates to water distributing devices and sprinklers for lawns and fields, and partcularly to what I choose to term a rotary square lawn sprinkler.

The main object of my invention is to provide a special water sprinkler for uniformly watering a lawn upon its entire area.

Another object of my invention is to have a rotary lawn sprinkler which is rotated by the reaction produced by the water flow.

A further object of this invention is to have lawn sprinkler with a stationary base or support and a rotary sprinkler head with hollow arms having a plurality of water jets disposed in effective positions for obtaining maximum driving effect for the head from the issuing water jets and also a maximum distributing effect of the water sprinkled to cover the desired area effectively.

It is also a special object of the invention to have means for watering an area that is substantially twice that which the water supply pressure should lead any one to expect to be obtained.

It is also an object to water uniformly any smaller area by merely throttling the supply valve.

It is also an object to have the lawn sprinkler provided with valve means effective to cause a substantially square area to be watered by the device and equalize all or at least the major portion of the bearing end thrust of the sprinkler head in order to reduce friction without the use of ball bearings.

It is likewise an object herein to so dimension and arrange the jet apertures on the hollow arms of the head as to obtain the best trajectories for these jets and simultaneously arrive at maximum water sprinkling and maximum power for rotating the head during operation.

It is, of course, a practical object to have a lawn sprinkler of the character indicated which is simple to make and simple to operate in order to encourage wide distribution thereof on the market.

Other objects and advantages of my invention will appear in greater detail as the specification proceeds.

In order to facilitate ready comprehension of this invention for a proper appeciation of the salient features thereof, the invention is illustrated on the accompanying drawing forming part hereof, and in which:

Figure 1 is a fragmentary top plan elevation of a rotary square lawn sprinkler made according to the invention and embodying the same in a practical form, portions being in section;

Fig. 2 is a fragmentary side elevation of the same lawn sprinkler partly in section to disclose constructional detail;

Fig. 3 is a fragmentary end elevation of the same sprinkler as seen from either side in Fig. 2;

Figure 4 is a fragmentary side elevation, partly in section, showing a modification of the invention;

Figure 5 is a fragmentary vertical section of another modification of the invention;

Figure 6 is a fragmentary side elevation of yet another modification of this invention; and Figure 7 is a top plan elevation of the present sprinkler shown in operative position on a square lawn.

Throughout the views, the same reference numerals indicate the same or like parts and features.

Lawn sprinklers are, of course, well known, and even rotary sprinklers are in use in many instances as more or less effective and supposedly automatic means for watering lawns. However, known sprinklers leave much to be desired in performance, both as to effectiveness and latitude of sprinkling, as well as reliability in operation. Upon considering this problem, it has occurred to me that the question of watering lawns, especially lawns of square form, a new approach in the design and construction would have to be adopted in order to effect satisfactory watering of a given lawn, and especially to obtain uniform watering over the whole area involved. As a result of such consideration, I have succeeded in producing a rotary square lawn sprinkler along the lines already intimated, which will now be described in detail in the following, due reference being had again to the drawing.

Hence, in the practice of my invention, referring particularly to Figures 1, 2, 3 and 7, the present sprinkler, generally indicated at 8 primarily includes a pair of elongated opposite feet 9 (one shown) from which the corner supports 10, 10, 10 extend to a substantially horizontal platform 11 to form a stationary base for the sprinkler as a whole. Preferably, as shown in Figure 7, the lawn 12 is square in form and the sprinkler 8 placed substantially in the center with the hose 13 connecting this sprinkler to a pressure water supply source such as a faucet or water pipe.

From the platform 11 depends a threaded cylindrical flange 14 with a preferably transparent or translucent plastic screw cap 15 screwed up thereon and enclosing a water chamber 16 below an inlet chamber 17 which communicates directly with the internally threaded side hub 18 to which the hose 13 may be connected by means of an externally threaded fixture on the end of the same. Upon the base is a fixed upwardly extending support 19 for an upright rotary tube 20 which has a flaring flange 21 at its lower end within chamber 16 serving to retain a clover shaped flat metal or plastic cam 22 in contact with the underside of platform 11 and also retain tube 20 assembled with the base. At the upper end of this tube is fixed a cross piece hub 23 from which project two opposite hollow sprinkler arms 24, 24 internally communicating with tube 20 to receive water therefrom as will now be explained. Incidentally, the outer ends of arms 24 each have a plug 25 screwed into the same as a closure.

In the bottom of upper chamber 17 is cut an elongated slot 26 through to lower chamber 16, while the four leaf or clover cam 22 is disposed between in such fashion that when rotated by tube 20, it will gradually cut off communication between and then gradually restore communication four times during each revolution of the cam. In order to ensure such positive rotation, the tube flange 21 has a tongue 27 extending into an inner slot 28 in the cam, while above this cam is a shallow chamber 29 serving to equalize water thrust on both sides of the cam to eliminate friction during rotation. The slot 26 thus has its water flow down into chamber 16 interrupted by the cam so that the water entering chamber 16 from above will arrive in graduated pulsations and thus enter the bottom of tube 20 and in such pulsating manner reach arms 24, 24. The profile curvature of the several similar cam leaves or sections 30, 30, etc., is calculated to be effective to allow sufficient water to be fed to the arms 24 to reach the corners 31, 31, etc., of lawn 12 but cut down on the supply when the arms spray the sides 32, 32, etc. This is effected by means of a constant minimum flow of water from the upper chamber 17 through a pair of constantly open orifices 33, 33 in the rotary tube 20 passing water directly to the interior thereof, during the varied flow through slot 26 past cam 22 and its leaves 30.

The mentioned sprinkler arms, as well as hollow cross piece 23 are provided with a special arrangement of orifices for the present purpose, certain of these orifices being effective to drive the arms and thereby the cross piece 23 and tube 20 with its bottom cam 22 while the other orifices serve to scatter water upon the remote area of the lawn. Thus, upon each arm 24 are mounted three or more small nozzles 34, 34, etc., varying slightly in size and preferably disposed at angles of inclination to the horizon increasing up to about 56°, or at any other desired angle, the nozzles on one arm being opposite to those on the other arm but pitched in the direction of rotation on both arms. The water jets projected by these nozzles are intended to be long range, and reach into the corners 31 of the lawn when the water passes through orifices 33 and slot 26 during maximum opening between the leaves 30 of cam 22, but shorten in range merely to reach sides 32 when the cam leaves close off slot 26 in order to avoid watering sidewalks beside the lawn.

The actual driving of the rotor formed by the arms and cross piece or head 23 is performed by further orifices in these arms that are disposed upon the opposite sides thereof with respect to nozzles 34 in a gradually rising series, both in inclination and bore, beginning at the outer end with small aperture 35 at about 13° above the horizon, then the larger orifice 36 at about 18°, orifice 37 at about a 22° elevation above the horizon, and so on in calculated steps varying from 5° to 3° and with increase in the bore of the orifice at each step up to the central orifice disposed at 45° to the horizon. The trajectories of the jets relative to these orifices differ from an almost horizontal jet from the outermost orifice 35 to a much longer and higher trajectory jet from inner orifice 38 due to its greater elevation and continue with still longer trajectories from jets 34, 34 etc. The net result is that the rotor as a whole is driven clockwise in the direction opposite to that which nozzles 34 tend to drive it, and the entire area of the lawn is substantially uniformly watered. The central area close to the sprinkler is supplied by a small amount of leakage from the top of hollow support 19 upon which the head or cross bar 23 rests. In order to eliminate friction as far as possible from between the cross piece and the support, an anti-friction gasket or washer of plastic may be interposed. This may be made of Teflon, nylon or rubber, or of any other suitable material, as desired.

The sprinkler rotor comprising the sprinkler arms, head and tube with its bottom cam rotates as stated by the resulting drive of the variously inclined jets projecting backward while the jets from the nozzles 34 are projected forwardly in the direction of rotation to maximize their trajectory. Since the latter are located close to the center of rotation, their reaction is overpowered by the relatively stronger reaction of the long series of jets that extend to the outer ends of the arms so as to maintain rotation. The jets in all instances fluctuate in their projection from the sprinkler during rotation due to the effect of the cam as stated so as to water concentric squares.

Variation of the water pressure of the jets may be effected by other forms of cams, as will now be noted, referring to Figs. 4, 5 and 6. In Fig. 4 is shown a rotary center tube 39 extending down into the serrated cup 40 forming part of a stationary supporting plate 41 secured by screws 42, 42 to the underside of platform 43 replacing platform 11. The tube has the constant flow apertures 44 and terminates at the bottom in the bottom tongues 45 co-operating with the bottom openings 46 of tube 39 when the latter rotates. The effect is similar to that obtained by co-operation of cam 22 with slot 26 already described, the water from inlet hub 46 being offered varying obstruction to its flow up through tube 39 and the latter being retained in assembled relation to the base 47 by a retaining flange 48 on this tube in water chamber 49 of said base.

Figure 5 is another modification in which the tube 50 has a plurality of downwardly open slots 51 and is rotatable on stationary plate 52 secured to a base in similar manner to plate 41 in Figure 4, but having upward cam projections 53, 53 within the tube controlling the slots during rotation of this tube. The flange 54 on tube 50 retains it from vertical displacement by engaging beneath the platform 55 of the base (not shown). Other features resemble base 47 or base 9, 10, 11 previously described.

In Figure 6 is shown a somewhat similar modification virtually forming the reverse construction from that of Figure 4, for the inner upstanding projections 56 upon plate 57 co-operate with the slots 58 between cam projections 59, 59 to control water flow up into tube 60 which also has the constant flow orifices 61. The rest of the base and water chamber are not shown as being known from Figures 1 to 4.

Manifestly, other variations may be resorted to and parts and features may be further modified than as suggested or used without others within the scope of the appended claims.

Having now fully described my invention, I claim:

1. A rotary square lawn sprinkler of the character described including a stationary stand forming a base having an internal water chamber with a connection for a hose or water supply pipe communicating with the chamber, an upwardly extending hollow support upon the base and fixedly connected thereto, a rotary sprinkler head rotatably mounted upon the hollow support and receiving water from the water chamber in the interior of said support, means within the latter for supplying the sprinkler head with a constant minimum flow of water, said sprinkler head including a pair of opposite sprinkler arms surmounting a depending tube extending down into the hollow support, said means for supplying said sprinkler head with water including at least one orifice in the side of said depending tube, a cam movable by said tube for varying the water pressure of the water supplied to the tube independently of said orifice, said cam being rigid with the lower end of the depending tube, said base having a lower water chamber with a slot, periodically covered by said cam, interconnecting the lower chamber with the first mentioned water chamber fed by the water connection from the supply by way of a hose or water supply pipe, said cam comprising a rotary plate secured to the lower end of the tube and having four radially projecting leaves or cam sections, the lower water chamber having a thrust equalizing recess above the cam and an externally threaded hub with a cap screwed thereon to form a removable closure therefor.

2. A rotary square lawn sprinkler of the character described including a stationary stand forming a base having an internal water chamber with a connection for a hose or water supply pipe communicating with the chamber, an upwardly extending hollow support upon the base fixedly connected thereto, a rotary sprinkler head rotatably mounted upon the hollow support and receiving water from the water chamber in the interior of said support, means within the latter for supplying the sprinkler head with a constant minimum water flow, said sprinkler head including a pair of oppositely disposed sprinkler arms surmounting a depending tube extending down into the hollow support, said depending tube having at least one orifice in thte side thereof to form said minimum constant water supply for the rotor, and a cam forming part of the lower end of the depending tube for varying the pressure of the water supplied to the tube independently of said orifice, said base having a cover plate supporting said tube, said cover plate having several upwardly projecting members disposed in a circle concentrically with respect to said tube, said upwardly projecting members cooperating with the cam portion of said tube periodically to interrupt the flow of water to the lower end of said tube from the water chamber in said base.

3. A rotary square lawn sprinkler according to claim 1, wherein the sprinkler arms each have a series of orifices increasing in inclination from the outermost to the innermost and angularly ranging from about 10° to 45° in relation to the horizon.

4. A rotary square lawn sprinkler according to claim 3, wherein the sprinkler arms have the series of orifices varying in bore from a small diameter in the outermost orifice to a relatively greater diameter in the innermost orifice, with the orifices therebetween gradually increasing in bore inwardly toward the center of the rotor.

5. A rotary square lawn sprinkler according to claim 3, wherein each sprinkler arm has a group of nozzles fixed upon one side thereof in inclined position with respect to the horizon but on the opposite side with respect to that side upon which the series of variously inclined orifices is located, said nozzles being limited to the inner end of each arm.

6. A rotary sprinkler according to claim 5 wherein the said series of orifices are disposed at angles of inclination above the horizon varying from about 10° or less for the outermost smallest orifice to 45° for the innermost at the center of rotation and up to 60° or more for the largest orifice situated part way out on the advancing side of the opposite arm.

7. A rotary sprinkler according to claim 5 wherein said orifices, varying in size and angles of elevation as claimed, are spaced further apart at the beginning of the series at the outer end on the retreating side of the arm than the orifices nearer the center of rotation.

8. A rotary square lawn sprinkler according to claim 1, wherein the said rotary sprinkler head has a pair of oppositely disposed horizontal tubular arms, a series of orifices of varying size starting at the outer end on the retreating side of each arm with the smallest orifice at a low angle of elevation above the horizon and continuing inward with larger orifices set at increasing angles of elevation to a central orifice at a 45° angle and continuing beyond the center with a few larger orifices on the inner end of the advancing side of the opposite arm and ending with the largest orifice part way out on said arm at an angle of elevation of about 60° or more as desired, said series of orifices being spaced at relatively larger intervals at the beginning and at decreasing intervals near the center of rotation.

9. A rotary lawn sprinkler according to claim 8, wherein a series of orifices start at the outer end on the retreating side of each arm with the smallest orifice, the second orifice having an area twice as big as the first orifice, the third orifice having an area three times as big as the first, etc. up to the last orifice in the series situated beyond the center of rotation and a short way out on the advancing side of the opposite arm having an area approximately equal to the number of orifices multiplied by the area of the first orifice.

References Cited in the file of this patent

UNITED STATES PATENTS

| | | |
|---|---|---|
| 935,071 | Vossler | Sept. 28, 1909 |
| 1,577,225 | Granger | Mar. 16, 1926 |
| 1,776,714 | Armstrong | Sept. 23, 1930 |
| 1,813,807 | KeHering | July 7, 1931 |
| 2,376,007 | Quigley | May 15, 1945 |
| 2,600,987 | Gallice | June 17, 1952 |
| 2,723,157 | Thompson | Nov. 8, 1955 |
| 2,729,504 | Zukas | Jan. 3, 1956 |
| 2,739,839 | Greener | Mar. 27, 1956 |